D. DALZELL.
VEHICLE-AXLES.
No. 182,644. Patented Sept. 26, 1876.
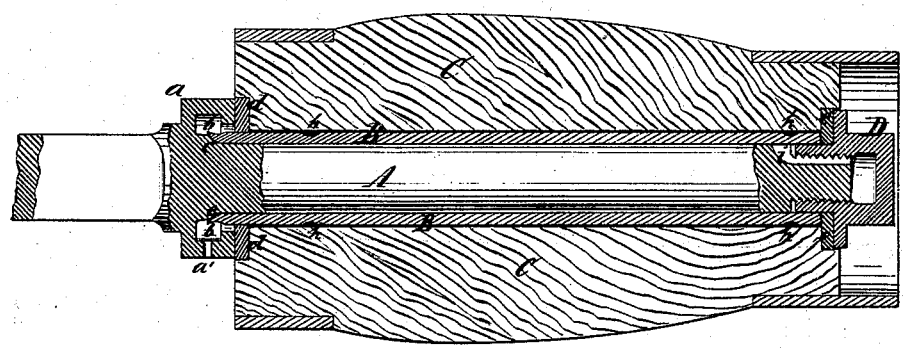
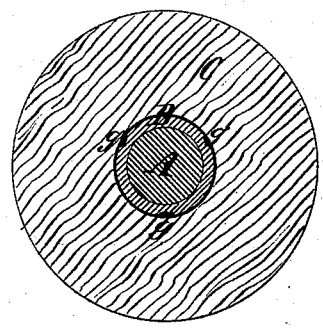
Witnesses:
D. B. Wilmot
H. D. Donnelly
Inventor:
David Dalzell
By his attorney
Chas. W. Forbes

UNITED STATES PATENT OFFICE.

DAVID DALZELL, OF SOUTH EGREMONT, MASSACHUSETTS.

IMPROVEMENT IN VEHICLE-AXLES.

Speccifiation forming part of Letters Patent No. 182,644, dated September 26, 1876; application filed July 14, 1876.

*To all whom it may concern:*

Be it known that I, DAVID DALZELL, of South Egremont, county of Berkshire and State of Massachusetts, have invented a new and useful Improvement in Carriage-Axles; and I hereby declare the following to be a full, clear, and exact description thereof, reference being had to the accompanying drawing, forming a part of this specification, in which—

Figure 1 is a longitudinal section, and Fig. 2 a cross-section, of the hub, box, and axle.

My invention consists in forming an annular chamber within the collar, and extending the journal-bearing directly therein to accommodate the end of the straight journal-box, and allow the periphery of said collar to receive the entire inward thrust of the wheel.

My invention also consists in forming a circumferential groove within the annular chamber, to receive the surplus oil escaping from the journal-bearing.

My invention further consists in a means for securing the journal-box within the hub, all as hereinafter described, and subsequently pointed out in the claims.

In the drawing, A represents the journal or arm of the axle; B, the box; C, the hub, and D the nut.

The collar $a$ is located outside of the end of the hub, as shown in Fig. 1, and is constructed with an annular-grooved chamber, $b$, to accommodate the projecting end of the box B, and provide a receptacle for the surplus oil escaping from the journal-bearing. This chamber and receptacle $b$ may be provided with an outlet, $a'$, arranged at its lowest point, to discharge the surplus oil from the under side of the collar, and entirely clear the wheel.

The box B is a plain tube of wrought or cast metal, or other suitable material, and is extended into the chambered collar about midway thereof, and its inner edge slightly beveled, as shown in Fig. 1, which, in conjunction with the enlargement $c$, forms a channel that directs the surplus oil to the groove in the chamber $b$.

Heretofore this type of axle has been constructed with an enlargement or swell upon the arm extending forward of the collar and forming an end bearing for the journal-box.

In my invention this enlargement or swell may be entirely dispensed with, or is reduced in length and confined within the chambered collar, and merely serves to direct the surplus oil, escaping from the journal, to the circumferential groove.

The journal-box B is not intended to bear against the enlargement $c$, or any portion of the collar, the entire inward thrust of the wheel being received by the periphery of the collar. The box B is also provided with external grooves $g\ h$ passing around the same, and lengthwise thereof.

These grooves are designed to assist in securing the box to the hub when an adhesive cement is employed for this purpose. Wedges or keys may also be used and driven into the longitudinal grooves $g$.

The nut D is constructed with an internal chamber, as shown, to serve as a reservoir for oil, the bearing being supplied through the connecting-channel $i$, and the surplus oil working into the chamber $b$, in the collar, by the motion of the vehicle.

It is only necessary to remove the nut whenever oil is supplied to the reservoir, the wheel remaining on the axle.

This feature of my device I do not claim in this application, as Letters Patent embracing it have already been granted to me.

A flexible washer, $e$, is arranged upon the inner side of the collar of the nut in the usual manner.

The arrangement of the collar and journal-box, as shown, in relation to the hub, secures a long journal-bearing, and insures increased strength, for the reason that the end of the hub abuts against the periphery of the collar, and when the wheel strikes an obstruction the strain is received by the collar and transmitted to the square or enlarged portion of the axle behind the collar. A flexible washer, $d$, may be placed between the collar and hub to relieve the jar.

This arrangement of the collar, provided with the oil receptacle and outlet, prevents the escaping oil from flowing upon and soaking into the hub, and thereby loosening the spokes and impairing the strength of the wheel and soiling its exterior and the garments of passengers.

Having fully described my invention, what I claim, and desire to secure by Letters Patent, is—

1. The axle-arm A, constructed with a direct journal-bearing surface extending within the chambered collar $a$, to accommodate the projecting end of the straight journal-box B, and allow said collar to receive the entire inward thrust of the wheel, as set forth.

2. The collar $a$, constructed with a grooved chamber, (with or without the outlet $a'$), substantially as shown.

3. The box B, provided with the external grooves $g$ $h$, for the purpose specified.

DAVID DALZELL.

Witnesses:
CHAS. W. FORBES,
EDW. KENT, Jr.